United States Patent
Choi

(10) Patent No.: US 6,666,557 B1
(45) Date of Patent: Dec. 23, 2003

(54) REFLECTION TYPE PROJECTOR

(75) Inventor: Soon-cheol Choi, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 771 days.

(21) Appl. No.: 09/057,585

(22) Filed: Apr. 9, 1998

(30) Foreign Application Priority Data

Apr. 9, 1997 (KR) .......................................... 97-13025
Apr. 10, 1997 (KR) .......................................... 97-13222

(51) Int. Cl.[7] .............................................. G03B 21/14
(52) U.S. Cl. .......................................... 353/31; 353/81
(58) Field of Search .............................. 353/20, 31, 33, 353/34, 37, 81; 349/8, 7, 5; 348/742, 743, 771

(56) References Cited

U.S. PATENT DOCUMENTS

| | | | | |
|---|---|---|---|---|
| 4,969,730 A | * | 11/1990 | Van Den Brandt | 353/31 |
| 5,098,184 A | * | 3/1992 | Van Den Brandt et al. | 353/38 |
| 5,309,188 A | | 5/1994 | Burstyn | 353/33 |
| 5,374,968 A | | 12/1994 | Haven et al. | 353/31 |
| 5,420,655 A | | 5/1995 | Shimizu | 353/33 |
| 5,517,340 A | * | 5/1996 | Doany et al. | 348/742 |
| 5,612,753 A | * | 3/1997 | Poradish et al. | 348/743 |
| 5,626,408 A | * | 5/1997 | Heynderickx et al. | 353/20 |
| 5,777,789 A | * | 7/1998 | Chiu et al. | 353/34 |
| 5,826,959 A | * | 10/1998 | Atsuchi | 353/20 |
| 5,829,854 A | * | 11/1998 | Jones | 353/33 |
| 5,829,858 A | * | 11/1998 | Levis et al. | 353/98 |
| 5,863,125 A | * | 1/1999 | Doany | 353/20 |

FOREIGN PATENT DOCUMENTS

| | | |
|---|---|---|
| EP | 0 646 828 | 4/1995 |
| GB | 2 295 743 | 6/1996 |
| JP | 63-292187 | 11/1988 |
| JP | 5-66382 | 3/1993 |
| JP | 5-257110 | 10/1993 |
| JP | 6-265887 | 6/1994 |
| JP | 8-234109 | 9/1996 |

* cited by examiner

Primary Examiner—William Dowling
(74) Attorney, Agent, or Firm—Sughrue Mion, PLLC

(57) ABSTRACT

A reflection type projector including a critical angle prism for changing the path of light. The reflection type projector includes a light source for generating and emitting light, an image forming unit having a multiplicity of pixels in a two-dimensional array structure, each of the pixels being independently driven, for forming and reflecting an image from the input light, a critical angle prism having a transmission/reflection surface disposed along an optical path of the light, to transmit the light input from the light source and reflect the light re-entering from the image forming unit, and a projection lens unit for enlarging and transmitting the light reflected from the transmission/reflection surface of the critical angle prism onto a screen.

21 Claims, 8 Drawing Sheets

REFLECTION TYPE PROJECTOR

BACKGROUND OF THE INVENTION

1. Field of the Invention

The present invention relates in general to a reflection type projector, and more particularly, to a reflection type projector capable of increasing the intensity of light projected onto a screen.

2. Description of the Related Art

A projector projects a formed image onto a screen using an additional light source. The projector is usually classified as a projection type projector or a reflection type projector according to the way by which the image is formed.

FIG. 1 shows an optical system of a conventional reflection type projector. The conventional reflection type projector includes a light source 10 for emitting light, a color wheel 20 for selectively transmitting a certain color of light, a scrambler 30 for mixing rays of the input light having different degrees of intensity into a uniform beam, a condensing lens 32, a collimating lens 34, a polarization beam splitter 40 for changing an optical path of the light, a display device 50 for forming an image by selectively reflecting an input light, and a projection lens unit 60 for projecting an input light onto a screen (not shown).

The light source 10 is comprised of a lamp 11, such as a metal haloid lamp or a xenon arc lamp, for generating light, and a reflection mirror 13 for reflecting the light emitted from the lamp 11. The color wheel 20 installed along the optical path of the light between the light source 10 and the scrambler 30 is rotated by a driving motor 21. The color wheel 20 is composed of color filters of red (R), green (G) and blue (B). The color wheel 20 rotates at a speed corresponding to the response speed of the display device. At any given time, one of the color filters R, G and B is disposed along the optical path of the light, according to the response speed of the display device 50.

The scrambler 30 mixes the input light through diffused reflection to make uniform light. The condensing lens 32 converges the light passing through the scrambler 30, which then diverges, to enlarge a transmission width of the light. The collimating lens 34 condenses the input divergent light to make parallel light beams.

The polarization beam splitter 40 is arranged in the optical path of the light between the collimating lens 34 and the display device 50, and changes the optical path of an input light by selectively transmitting or reflecting the input light at a mirror surface 41 according to the polarization component thereof. That is, the light input from the light source 10 is selectively transmitted or reflected depending on the polarization component of the light.

In FIG. 1, the light transmitted from the polarization beam splitter 40 is used as an efficiency light. A ferroelectric liquid crystal display (FLCD) of a two-dimensional array structure exhibiting an excellent response speed is used as the display device 50. The display device 50 has a multiplicity of reflection areas of a two-dimensional array structure, each area being independently driven to form an image by changing the polarization direction of the input light.

The light input to the display device 50 is reflected and re-enters the polarization beam splitter 40. Here, the efficiency light re-entering the polarization beam splitter 40 has had its polarization direction changed to 90° by the display device 50. Then, the beam is reflected from the mirror surface 41 of the polarization beam splitter 40 to proceed toward the projection lens unit 60. The beam passes through the projection lens unit 60 and is projected onto a screen (not shown).

As described above, the conventional reflection type projector requires parallel beams of light to be input into the polarization beam splitter, to avoid deterioration of the transmission/reflection according to the polarization component. Thus, the width of the light input into the polarization beams splitter must be increased to make the parallel beam between the light source and the polarization beam splitter, which also requires a larger polarization beam splitter and projection lens unit, which are expensive.

In another reflection type projector employing an FLCD, instead of the polarization beam splitter, the angle of the light input into the FLCD is different from that reflected therefrom, to thereby change the path of the light. Here, the FLCD is smaller than the collimating lens. Therefore, the optical distance between the FLCD and the projection lens unit must be lengthened or the slope of the FLCD must be increased. When the optical distance is lengthened, the diameter of the projection lens unit is reduced. On the other hand, an increase in the slope of the FLCD complicates the arrangement of optical axes between the FLCD and the projection lens unit.

SUMMARY OF THE INVENTION

To solve the above problems, it is an objective of the present invention to provide a reflection type projector having a critical angle prism which changes the path of light, to thereby simplify the arrangement of optical axes without the use of a polarization beam splitter or the increase in optical length.

It is another objective of the present invention to provide a reflection type projector in which three colors are irradiated onto a screen to improve optical efficiency and increase the intensity of the light projected on the screen.

Accordingly, to achieve the above first objective, there is provided a reflection type projector including: a light source for generating and emitting light; an image generation unit having a multiplicity of pixels in a two-dimensional array structure, each of the pixels being independently driven, for forming and reflecting an image from the input light; a critical angle prism having a transmission/reflection surface disposed along an optical path of the light, to transmit the light input from the light source and reflect the light re-entering from the image forming unit; and a projection lens unit for enlarging and transmitting the light reflected from the transmission/reflection surface of the critical angle prism onto a screen.

To achieve the second objective, there is provided a reflection type projector including: a light source for generating and emitting light; a first dichroic mirror, disposed along an optical path, for transmitting and reflecting input light according to a wavelength to divide the transmitted and reflected light into two; a first optical path changing unit for changing the path of one light beam divided by the first dichroic mirror; a first image forming unit for generating an image from input light passing through the first optical path changing unit; a second dichroic mirror for transmitting and reflecting the light reflected from the first dichroic mirror according to wavelength; a second optical path changing unit for changing the path of the other light beam divided by the second dichroic mirror; a second image forming unit for generating an image from input light passing through the second optical path changing unit; a third optical path changing unit for changing the path of the light transmitting the second dichroic mirror: a third image forming unit for generating an image from input light passing through the third optical path changing unit; a dichroic beam splitter having first and second mirror surfaces for selectively transmitting and reflecting the input light passing through the first, second and third optical path changing units in one direction according to wavelength; and a projection lens unit for enlarging and transmitting the light input from the dichroic beam splitter onto a screen.

The above and other features of the invention including various and novel details of construction and combination of parts will now be more particularly described with reference to the accompanying drawings and pointed out in the claims. It will be understood that the particular reflection type projector embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
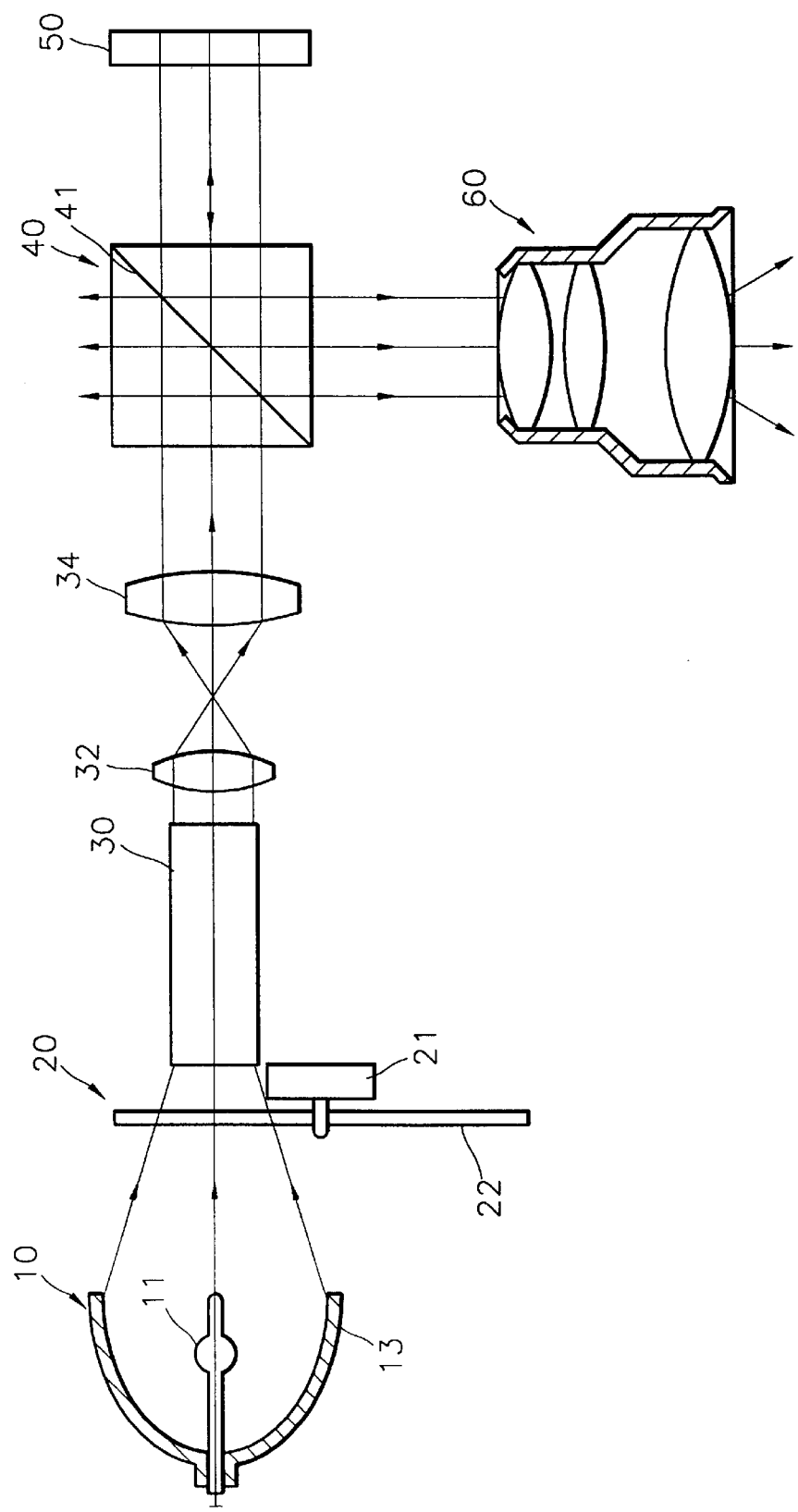
FIG. 1 is a view schematically showing the optical configuration of a conventional reflection type projector.
Figure 2:
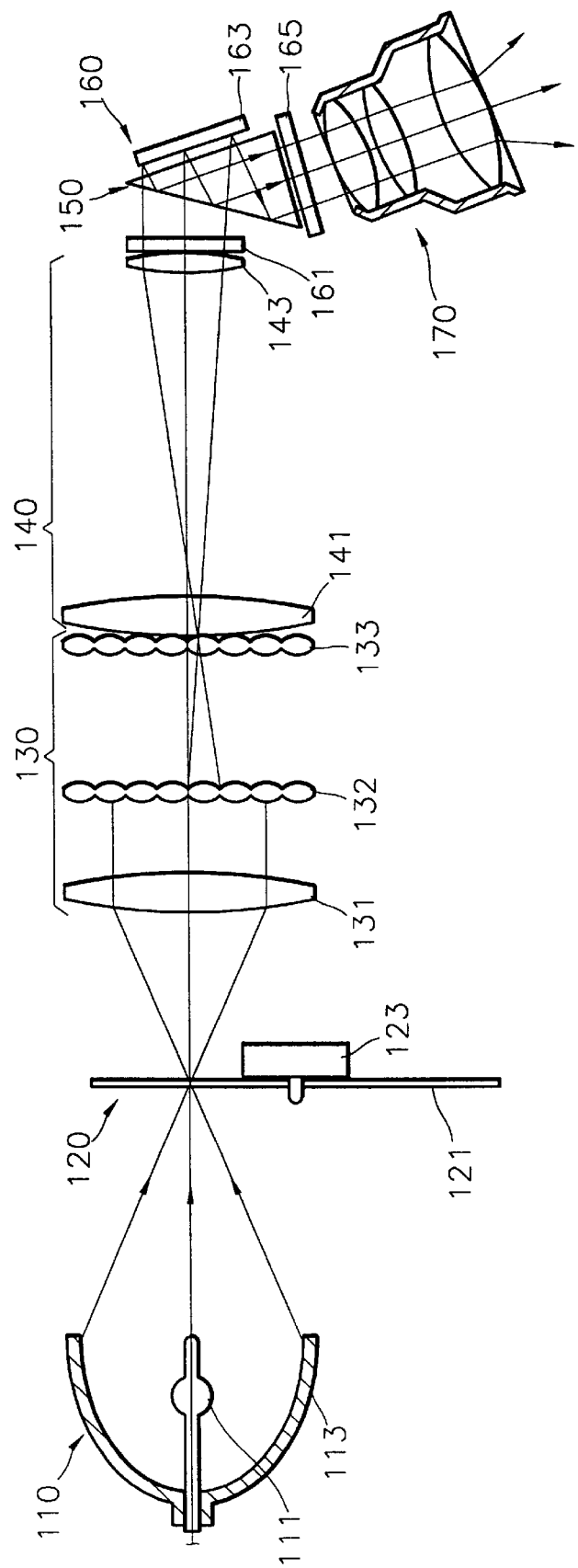
FIG. 2 is a view schematically showing the optical configuration of a reflection type projector according to a first embodiment of the present invention.
Figure 3:
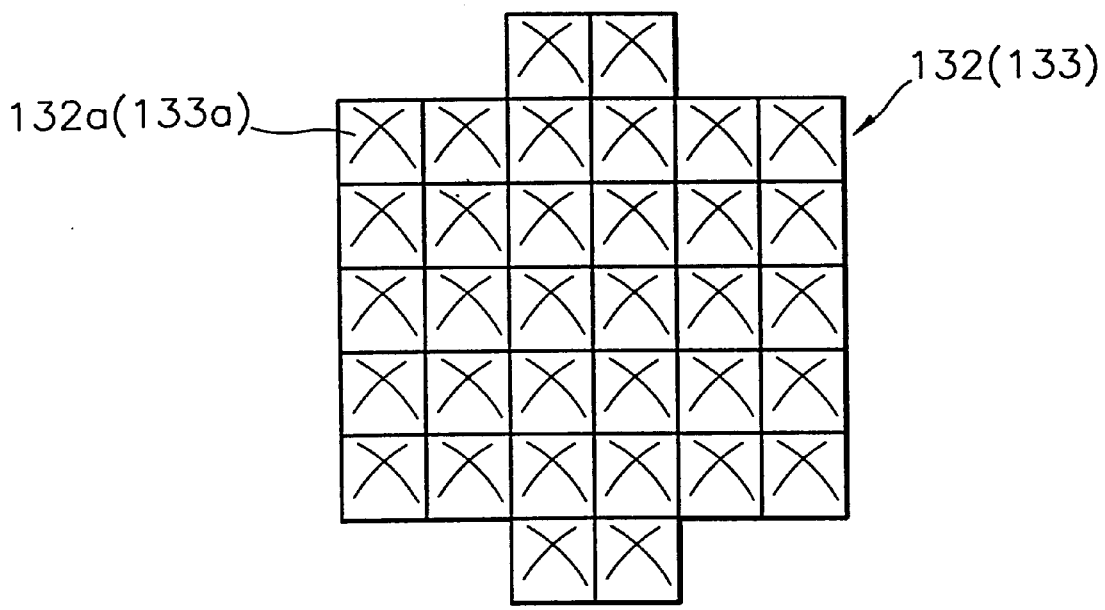
FIG. 3 is a view schematically illustrating the fly-eye lens shown in FIG. 2.
Figure 4:
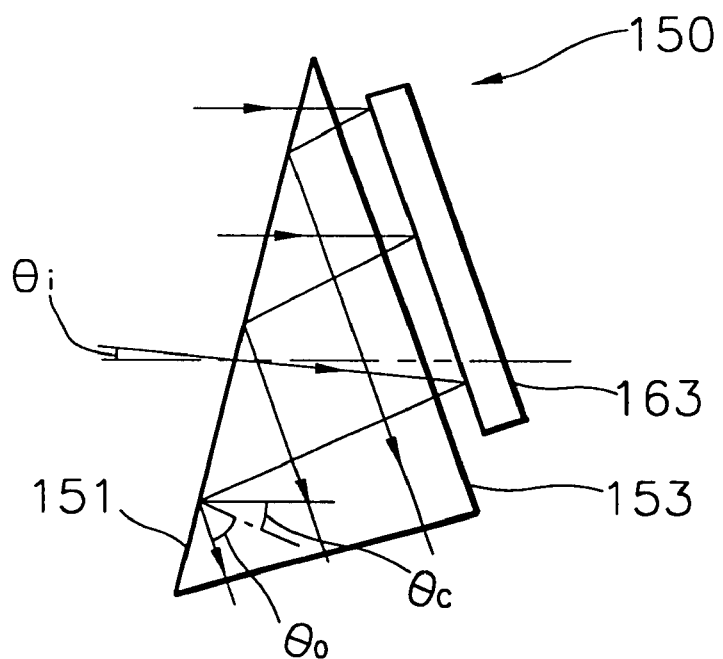
FIG. 4 is a schematic view of the optical configuration of a critical angle prism and FLCD.

Referring to FIGS. 2 through 4, a reflection type projector according to the first embodiment of the present invention includes a light source 110 for generating and emitting light, a color wheel 120 for selectively transmitting certain wavelengths of the light output from the light source 110 to select a color, an image forming unit 160, a critical angle prism 150 for transmitting light input from the light source 110 to the image forming unit 160 and reflecting light input from the image forming unit 160, and a projection lens unit 170 for enlarging and transmitting input light to a screen (not shown).

It is preferable that the optical path of the light between the color wheel 120 and the critical angle prism 150 includes a light mixing unit 130 for diverging/converging or diffusing and reflecting the light input from the light source 110 to make the light uniform, and a relay lens unit 140 for converging input light to make parallel light beams.

The light source 110 includes a lamp 111 for generating light, and a reflector 113 for reflecting the output light of the lamp 111 along a predetermined path. The reflector 113 may be an oval mirror in which the position of the lamp 111 is one focus and a point of convergence is another focus, or a parabolic mirror in which the position of the lamp 111 is one focus and light output from the lamp 111 and reflected from the reflector 113 is a parallel beam.

The color wheel 120 is disposed along the optical path of the light between the light source 110 and the light mixing unit 130, and includes a color filter 121 having three colors of red (R), green (G) and blue (B) or yellow (Y), cyan (C) and magenta (M) to selectively transmit light input from the light source 110. The colors of the color filter 121 are arranged on the wheel to cover equal areas. A driving portion 123 drives the color wheel 120 corresponding to a response speed of the image forming unit 160, to dispose one of the color filters 121 in the optical path of the light.

The light mixing unit 130 includes a condensing lens 131 for converging light transmitted by the color wheel 120, and first and second fly-eye lenses 132 and 133, which are adjacent, for converging input light. With reference to FIG. 3, the first and second fly-eye lenses 132 and 133 have an input surface and/or an output surface with a multiplicity of convex portions 132a and 133a, respectively. The ratio of horizontal to vertical surfaces of each of the convex portions 132a and 133a corresponds to that of a ferroelectric liquid crystal display (FLCD) 163 to be described later. The light converged by the convex portions 132a of the first fly-eye lens 132 is focused around the second fly-eye lens 133, to thereby make a uniform light by mixing the irregular light of the light source 110.

The relay lens unit 140 converges light transmitted from light mixing unit 130 onto the FLCD 163. The relay lens unit 140 includes a converging lens 141 for converging input light to make a diverging light, and a collimating lens 143 for converging the diverging light to make a parallel beam, disposed along the optical path of the light between the converging lens 141 and the critical angle prism 150.

With reference to FIG. 4, the critical angle prism 150 includes a transmission/reflection surface 151 for transmitting and changing the path of the light input from the relay lens unit 140, and total-internal-reflecting the light reflected from the FLCD 163. The transmission/reflection surface 151 is disposed to have an output angle $\theta_0$ defined between an optical axis of the light reflected from the transmission/reflection surface 151 and a normal axis of the transmission/reflection surface 151. The output angle $\theta_0$ is greater than the critical angle $\theta_c$. This is because the total internal reflection phenomenon occurs only when the angle of incidence of the light upon the boundary surface 151, on the other side of which is a less optically dense medium (air), is greater than the critical angle $\theta_c$. Here, the critical angle $\theta_c=\sin^{-1}$ (the refractive index of the second medium/the refractive index of the first medium), where the first medium is the critical angle prism, and the second medium is air. Thus, when $\theta_0$ is greater than $\theta_c$, the total internal reflection phenomenon occurs, without any of the incident light being refracted.

Referring again to FIG. 2, the image forming unit 160 includes a polarizer 161, a FLCD 163, and an analyzer 165, and generates an image from the light input via the critical angle prism 150. The polarizer 161 is disposed along the optical path of the light between the collimating lens 143 and the critical angle prism 150, and linearly-polarizes the non-polarized input light. The FLCD 163 faces the transmission surface 153 of the critical angle prism 150.

Preferably, the FLCD 163 and the transmission surface 153 are parallel to each other. The FLCD 163 has a two-dimensional array structure, and has a multiplicity of pixels, each pixel being independently driven. The light input to the FLCD 163 becomes linearly-polarized in one polarization direction or in various polarization directions, and is reflected to the critical angle prism 150. The analyzer 165 is disposed along the optical path of the light between the critical angle prism 150 and the projection lens unit 170, and selectively transmits the light transmitted from the transmission surface 153 and reflected from the transmission/reflection surface 151 according to a polarization direction.

A digital mirror device (DMD) may be employed as the image forming unit 160. The DMD faces the transmission surface 153 of the critical angle prism 150, and includes a multiplicity of reflection mirrors (not shown) of the two-dimensional array. Each of the reflection mirrors independently hinges to have various reflection angles for the same input angle. Thus, the reflection angle according to the input angle is independently selected for each pixel, to generate an image.

The projection lens unit 170 is disposed between the critical angle prism 150 and the screen, to enlarge and project the input light onto the screen.

Hereinafter, the operation of the reflection type projector according to the first embodiment will be described.

One color of the light emitted from the light source 100 is transmitted through the color wheel 120. The light is made uniform after passing through the light mixing unit 130 such as the condensing lens 131 and first and second fly-eye lenses 132 and 133, and becomes a parallel beam after being transmitted through the relay lens unit 140. Linearly-polarized light of one polarization direction of the parallel beam is selectively transmitted through the polarizer 161, and the parallel beam is transmitted through the critical angle prism 150 to the FLCD 163. Each pixel of the FLCD 163 is selectively driven, to generate and reflect an image corresponding to respective colors for forming an image on the screen. The light re-enters the critical angle prism 150, and the re-entering light is reflected from the transmission/reflection surface 151 of the critical angle prism 150. The reflected light is input into the analyzer 165. The analyzer 165 transmits the light of one polarization direction from the input light. The transmitted light passes through the projection lens unit 170 to be focused onto the screen. Here, an image frame is realized by sequentially overlapping images corresponding to respective colors on the screen.

Figure 5:
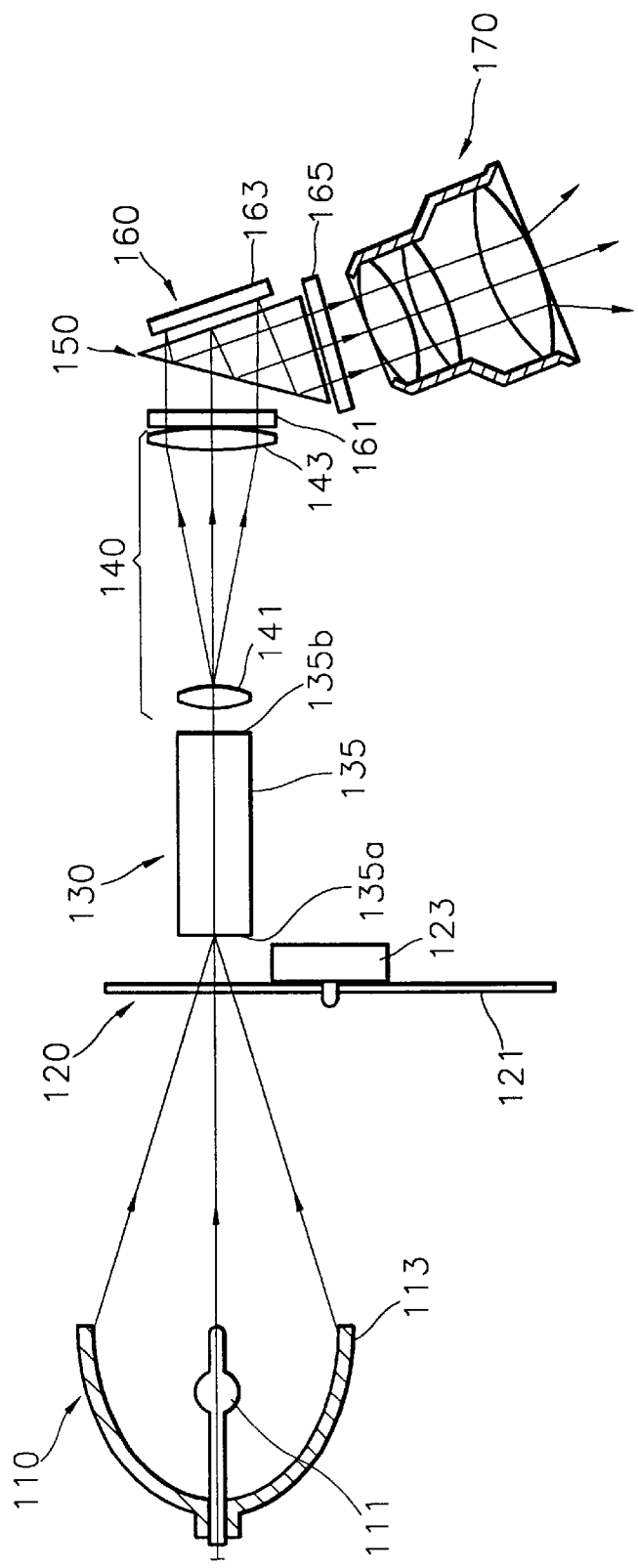
FIG. 5 is a schematic view of the optical configuration of a reflection type projector according to a second embodiment of the present invention.
Figure 6:
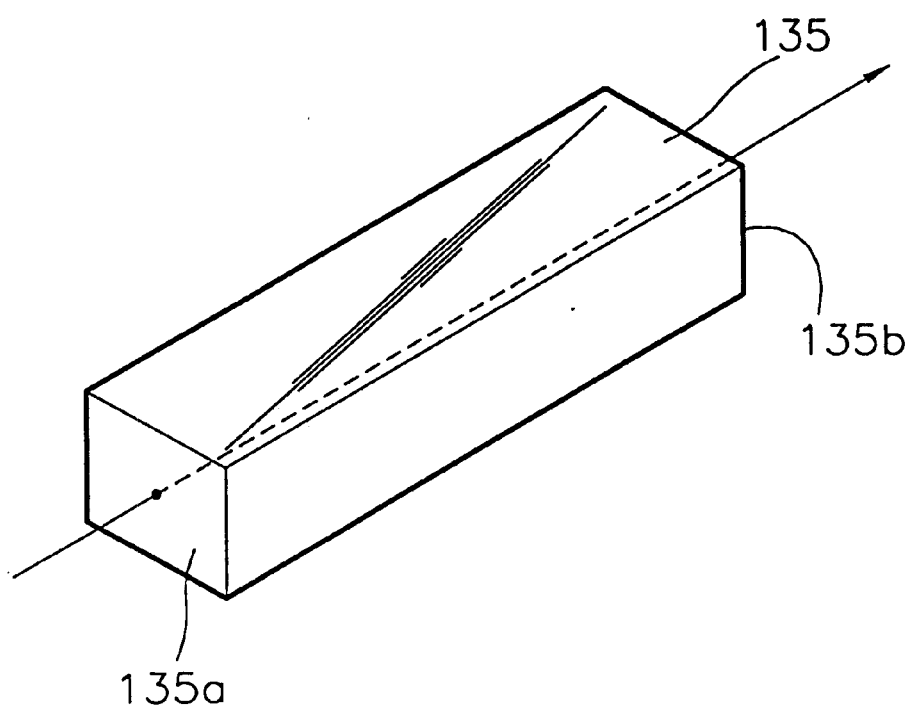
FIG. 6 is a perspective view of a scrambler employed as the light mixing unit of the present invention.

Referring to FIGS. 5 and 6, a second embodiment of the reflection type projector according to the present invention will now be described in detail. Here, the same reference numeral indicates the same elements throughout.

According to the characteristic feature of the present invention, a scrambler 135 for producing a uniform light by diffusing and reflecting the input light is employed as the light mixing unit 130. The scrambler 135 is a hexahedron glass block having input and output surfaces 135a and 135b both perpendicular to the optical path of the light. The ratio of the horizontal to vertical dimensions of the output surface 135b of the scrambler 135 is the same as that of the FLCD 163.

Similar to the first embodiment, the second embodiment of the present invention employs a critical angle prism without a polarization beam splitter sensitive to the input angle of the light during changing of the light path according to polarization. Thus, the optical axes of the optical system are easily arranged without increasing the overall length of the optical system.

Figure 7:
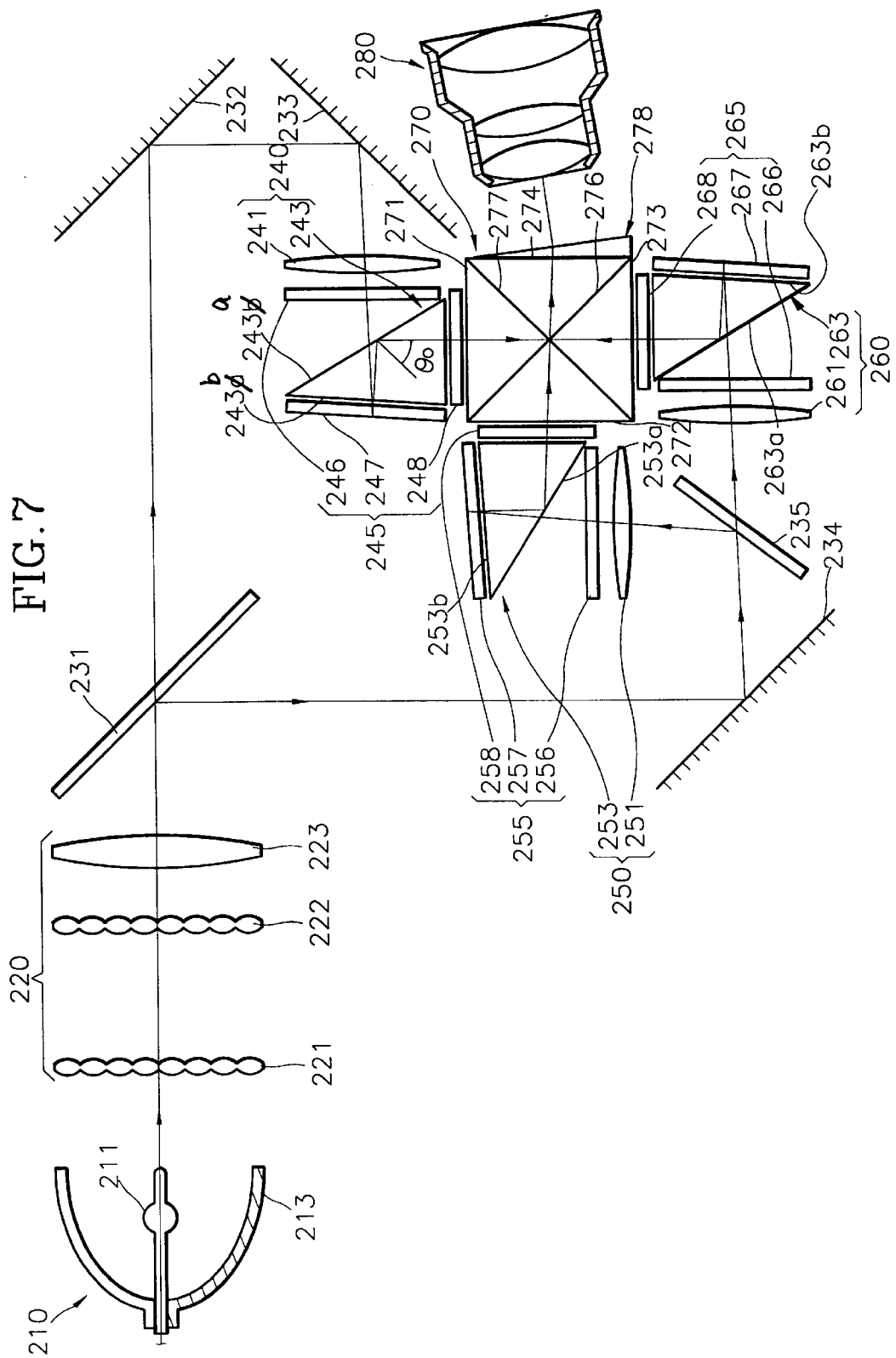
FIG. 7 is a schematic view of the optical configuration of a reflection type projector according to a third embodiment of the present invention.

Referring to FIG. 7, a third embodiment of the reflection type projector according to the present invention includes a light source 210 for generating light, first and second dichroic mirrors 231 and 235 disposed along the optical path of the light, for transmitting and reflecting the input light according to wavelength, first, second and third optical path changing units 240, 250 and 260 for changing an image from the input light, a dichroic beam splitter 270 for outputting the light input from the first, second and third optical path changing units 240, 250 and 260 in one direction, and a projection lens unit 280 for enlarging and transmitting the light input from the dichroic beam splitter 270.

The light source 210 includes a lamp 211 for generating the light, and a reflection mirror 213 for reflecting the light output from the lamp 211 along a predetermined path. The light source 210 is substantially the same as the light source 110 of the first and second embodiments, so the description thereof will be omitted.

It is preferable to further include a light mixing unit 220 for making a uniform light by diverging/converging or diffusing and reflecting the input light of the light source 210. FIG. 7 shows an example of employing first and second fly-eye lenses 221 and 222 which are adjacent, and a condensing lens 223 for converging the light transmitted from the second fly-eye lens 222, employed as the light mixing unit 220. Preferably, a parabolic mirror is used as the reflection mirror 213. The operations of the first and second fly-eye lenses 221 and 222 are substantially the same as those of the first and second fly-eye lenses 132 and 133 of the first embodiment illustrated with reference to FIGS. 2 and 3, and thus a detailed description thereof will be omitted.

Figure 8:
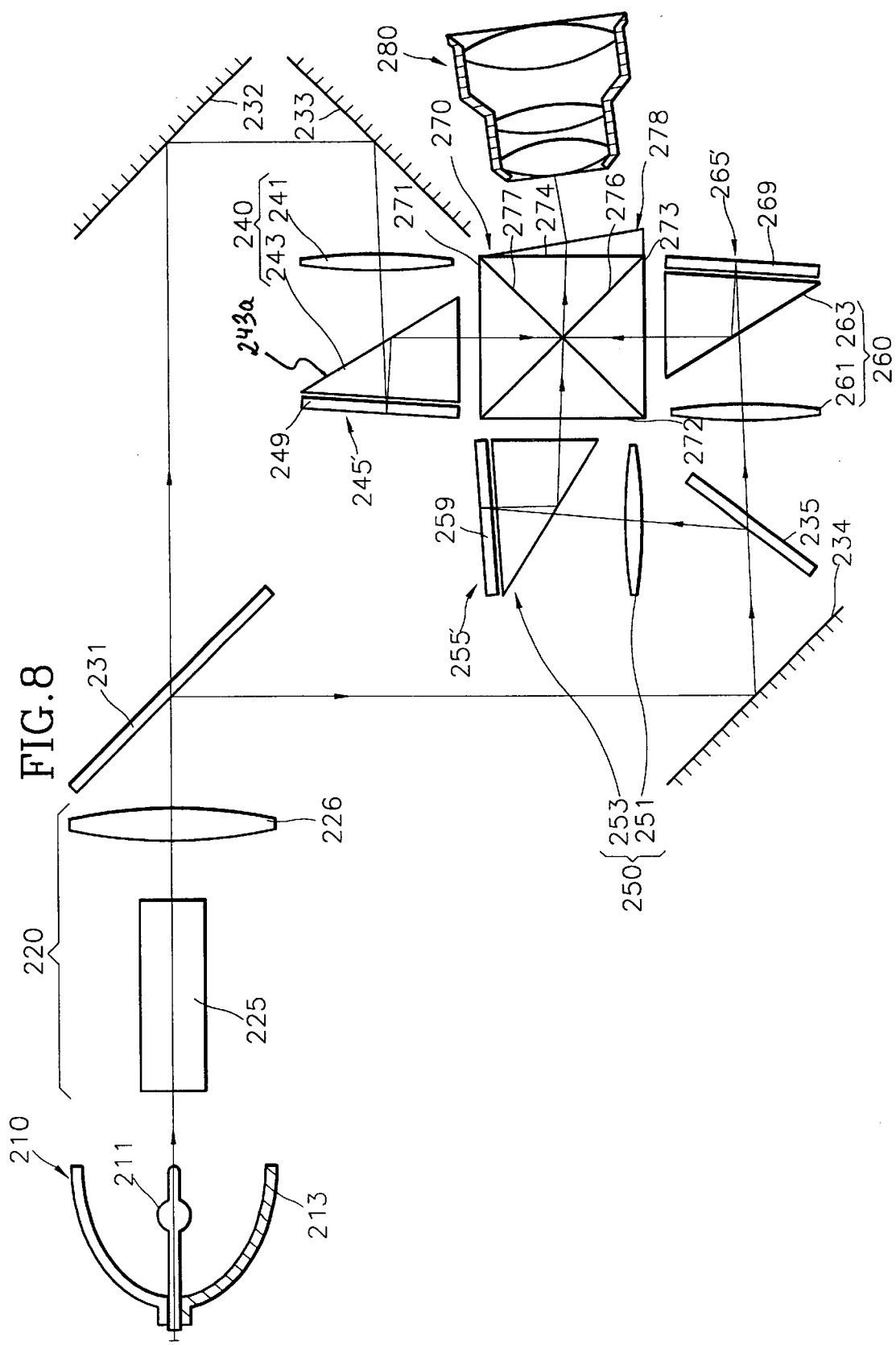
FIG. 8 is a schematic view of optical configuration of a reflection type projector according to a fourth embodiment of the present invention.

A scrambler 225 for making a uniform light by diffusing and reflecting the input light, and a converging lens 226, may also be employed as the light mixing unit 220, as shown in FIG. 8. Here, preferably, the reflection mirror 213 is an oval mirror. The operation of the scrambler 225 is substantially the same as the scrambler 135 illustrated with reference to FIGS. 5 and 6, and thus a detailed description thereof will be omitted. The converging lens 226 is disposed along the optical path of the light between the scrambler 225 and the first dichroic mirror 231, to converge the input light.

The first dichroic mirror 231 selectively transmits and reflects the light input from the light source 210 according to wavelength. For instance, the first dichroic mirror 231 is manufactured by dielectric-coating, and reflects green (G) and red (R) light, and transmits blue (B) light. The transmitted light is reflected from the first and second reflection mirrors 232 and 233, and then input to the first optical path changing unit 240 and the first image forming unit 245.

The light reflected from the first dichroic mirror 231 is reflected from the third reflection mirror 234, and then the reflected light is input to the second dichroic mirror 235. The second dichroic mirror 235 selectively transmits and reflects the input light according to wavelength. For instance, the second dichroic mirror 235 reflects green (G) light, and transmits red (R) light. The light reflected from the second dichroic mirror 235 is input to the second optical path changing unit 250 and the second image forming unit 255. And, the light transmitted from the second dichroic mirror 235 is input to the third optical path changing unit 260 and the third image forming unit 265.

The first optical path changing unit 240 changes the path of the light transmitted from the first dichroic mirror 231. The first image generation unit 245 generates an image from the input light passing through the first optical path changing unit 240. The first optical path changing unit 240 is comprised of the first converging lens 241, and a first prism 243. The first converging lens 241 converges the input diverging light to make a parallel beam. The first prism 243 includes a first transmission/reflection surface 243a for transmitting the light input from the first converging lens 241 and total internal reflecting the light reflected from the first image generation unit 245. An output angle $\theta_0$ defined between the optical axis of light reflected from the first transmission/reflection surface 243a and the normal axis of the first transmission/reflection surface 243a is greater than a critical angle. The first, second, and third prisms 243, 253 and 263, respectively, are substantially the same as the critical angle prism 150 illustrated in the first and second embodiments. Thus, a detailed description thereof will be omitted.

The first image forming unit 245 includes a first polarizer 246, a first FLCD 247, and a first analyzer 248. The first polarizer 246 is disposed along the optical path of the light between the first converging lens 241 and the first prism 243, and linearly-polarizes the non-polarized input light. The first FLCD 247 faces the first transmission surface 243b of the first prism 243. Here, the first FLCD 247 and the first transmission surface 243b are preferably parallel to each other. The first FLCD 247 has a two-dimensional structure and a multiplicity of pixels, each pixel being independently driven. The light input to the first FLCD 247 become linearly-polarized in one polarization direction or various polarization directions, and is reflected to the first prism 243. The first analyzer 248 is disposed along the optical path of the light between the first prism 243 and the dichroic beam splitter 270, and selectively transmits light which is reflected from the first FLCD 247, transmitted from the first transmission surface 243b and reflected from the first transmission/reflection surface 243a, according to polarization direction. The light transmitted from the first analyzer 248 is light transmitted from the first dichroic mirror 231, e.g., blue (B) light, and includes an image with respect to the blue color.

The second optical path changing unit 250 includes a second converging lens 251 and a second prism 253 which are disposed along the optical path of the light between the second dichroic mirror 235 and the dichroic beam splitter 270. Here, the operation of the second converging lens 251 and the second prism 253, and the optical arrangement thereof, are the same as those of first converging lens 241 and the first prism 243. Thus, a detailed description thereof will be omitted. The second image forming unit 255 is comprised of a second polarizer 256, a second FLCD 257, and a second analyzer 258, the operation and optical arrangement of which are substantially the same as those of the first image forming unit 245. Thus, a detailed description thereof will be omitted. Here, reference numerals 253a and 253b indicate a second transmission/reflection surface and a second transmission surface, respectively.

The third optical path changing unit 260 includes a third converging lens 261 and a third prism 263 for changing the optical path of the light transmitted from the second dichroic mirror 235, and is disposed along the optical path of the light between the second dichroic mirror 235 and the dichroic beam splitter 270. Here, the operation and the optical arrangement of the third converging lens 261 and the third prism 263 are substantially the same as those of the first converging lens 241 and the first prism 243. Thus, a detailed description thereof will be omitted. The third image forming unit 265 is comprised of a third polarizer 266, a third FLCD 267 and a third analyzer 268, the operation and optical arrangement of which are substantially the same as those of the first image forming unit 245, and thus a detailed description thereof will be omitted. Here, reference numerals 263a and 263b indicate a third transmission/reflection surface and a third transmission surface, respectively.

The dichroic beam spitter 270 has three input surfaces 271, 272 and 273 and one output surface 274. Each of the three input surfaces 271, 272 and 273 faces one of the first, second and third optical path changing units 240, 250 and 260. The path of the input light is changed so that the light passing through each of the optical path changing units 240, 250 and 260 exits from the output surface 274. Thus, the dichroic beam splitter 270 has first and second mirror surfaces 276 and 277 for selectively transmitting or reflecting the light according to wavelength. The first mirror surface 276, which is coated to transmit and reflect the light of one wavelength region, reflects the input light passing through the first optical path changing unit 240, and transmits the input light passing through the second and third optical path changing units 250 and 260. The second mirror surface 277, which is coated to transmit and reflect the light of another wavelength region, transmits the light passing through the first and second optical path changing units 240 and 250, and reflects the light passing through the third optical path changing unit 260.

Preferably, a correction prism 278 is disposed between the output surface 274 of the dichroic beam splitter 270 and the projection lens unit 280 to compensate for any aberration of the first, second and third prisms 243, 253 and 263, respectively. Moreover, the aberration, particularly chromatic aberration and distortion due to a change of the optical arrangement of the first through third prisms 243, 253 and 263 can be corrected, so that the optical axis of the light input through the first, second and third prisms 243, 253 and 263 is easily made perpendicular to each of the three input surfaces 271, 272 and 273 of the dichroic beam splitter 270. Also, the first, second and third prisms 243, 253 and 263 may be arranged such that the optical axis of the input light passes through a portion where the first mirror surface 276 meets with the second mirror surface 277 of the dichroic beam splitter 270, to improve the optical efficiency.

The projection lens unit 280 is disposed between the dichroic beam splitter 270 and a screen, and thus enlarges and projects the light input from the dichroic beam splitter 270 onto the screen.

FIG. 7 shows a reflection type projector when the light irradiated by the light source 210 and transmitted by the first dichroic mirror 231 is input to the first optical path changing unit 240, and the reflected light is input toward the second dichroic mirror 235. It is to be appreciated that the reflection type projector may be modified so that the light irradiated by the light source 210 and reflected by the first dichroic mirror 231 is input to the first optical path changing unit 240, and the transmitted light is input to the second dichroic mirror 235.

Hereinafter, the operation of a third embodiment of the reflection type projector according to the present invention will be described. As shown in the drawings, the light emitted from the light source 210 becomes uniform after passing through the light mixing unit 220, and the uniform light is input to the first dichroic mirror 231. The light input to the first dichroic mirror 231 is selectively transmitted and reflected according to wavelength. The light transmitted from the first dichroic mirror 231 is input to the first image forming unit 245 via the first optical path changing unit 240. The first image forming unit 245 selects a polarization direction of the input light according to each pixel region such that an image corresponding to the color of the input light is formed, and then the input light is reflected to the first prism 243. The light input to the first prism 243 is output to the input surface 271 of the dichroic beam splitter 270. The light reflected from the first dichroic mirror 231 is input to the second dichroic mirror 235. The second dichroic mirror 235 selectively transmits and reflects the input light according to wavelength. The reflected light is input to the input surface 272 of the dichroic beam splitter 270 via the second optical path changing unit 250 and the second image forming unit 255. Also, the light transmitted from the second dichroic mirror 235 is input to the input surface 273 of the dichroic beam splitter 270 via the third optical path changing unit 260 and the third image forming unit 265. The light input to the dichroic beam splitter 270 corresponding to the first and second mirror surfaces 276 and 277 is selectively transmitted and reflected and passes through the projection lens unit 280, overlapping pixel-by-pixel, to proceed toward the screen.

Referring to FIG. 8, a fourth embodiment of the reflection type projector according to the present invention will be described in detail. Here, the same reference numerals indicate the same elements shown in FIG. 7.

According to the characteristic feature of the fourth embodiment of the present invention, first, second and third digital mirror devices (DMD) 249, 259 and 269 are employed as first, second and third image forming units 245', 255' and 265' for forming an image from the input light. Here, the first, second and third polarizes and the first, second and third analyzers as shown in FIG. 7 are not required.

The first DMD 249 faces the first reflection surface 243*a* of the first prism 243, and includes a multiplicity of reflection mirrors (not shown) having a two-dimensional structure. Each of the reflection mirrors independently hinges to have various reflection angles with respect to the input light.

According to the third and fourth embodiments of the reflection type projector of the present invention, the first, second and third optical path changing units 240, 250 and 260 including the first, second and third prisms 243, 253 and 263 for transmitting or reflecting the input light according to the critical angle are disposed along the optical path, and the colors for composing an image frame using the first, second and third image generation units are overlapped, thereby greatly increasing the intensity of the light projected onto the screen. Since the polarization beam splitter sensitive to the input angle of the light is not used during changing of the optical path of the light according to polarization, the arrangement of the optical system is complicated.

What is claimed is:

1. A reflection type projector comprising:

a light source for emitting an input light;

a first dichroic mirror, disposed along an optical path of the input light, for dividing the input light into a first transmitted light beam and a first reflected light beam, the first dichroic mirror transmitting the first transmitted light beam and reflecting the first reflected light beam according to a wavelength;

a first optical path changing unit for changing the path of the first transmitted light beam from the first dichroic mirror, the first optical path changing unit including only one prism;

a first image forming unit for forming an image from the first transmitted light beam passing through the first optical path changing unit;

a second dichroic mirror, disposed along an optical path of the first reflected light beam from the first dichroic mirror, for dividing the first reflected light beam into a second transmitted light beam and a second reflected light beam, the second dichroic mirror transmitting the second transmitted light beam and reflecting the second reflected light beam according to a wavelength;

a second optical path changing unit for changing the path of the second reflected light beam from the second dichroic mirror, the second optical path changing unit including only one prism;

a second image forming unit for forming an image from the second reflected light beam passing through the second optical path changing unit;

a third optical path changing unit for changing the path of the second transmitted light beam from the second dichroic mirror;

a third image forming unit for forming an image from the second transmitted light beam passing through the third optical path changing unit, the third optical path changing unit including only one prism;

a dichroic beam splitter having a first and a second mirror surface for selectively transmitting and reflecting the input light passing through the first, second and third optical path changing units in one direction according to wavelength; and a projection lens unit for enlarging and transmitting the input light from the dichroic beam splitter.

2. The reflection type projector of claim 1, wherein the first optical path changing unit comprises:

a converging lens for converging input light; and a prism having a transmission/reflection surface for transmitting the input light from the converging lens and total internal reflecting the light reflected from the first image forming unit.

3. The reflection type projector of claim 2, wherein the transmission/reflection surface is disposed at an angle with respect to the optical axis of light reflected from the first image forming unit which is greater than a critical angle.

4. The reflection type projector of claim 1, wherein the first image forming unit comprises:

a polarizer for linearly-polarizing input light;

a ferroelectric liquid crystal display device for linearly polarizing light transmitted from the polarizer and passed through the first optical path changing unit, into linearly polarized light having a polarization direction independently selected according to respective regions; and an analyzer, disposed along the optical path of the light between the ferroelectric liquid crystal display device and the dichroic beam splitter, for transmitting light of one polarization direction.

5. The reflection type projector of claim 2, wherein the first image forming unit comprises:

a polarizer, disposed along the optical path of the light between the converging lens and the prism, for linearly polarizing input light;

a ferroelectric liquid crystal display device having a plurality of pixels for linearly-polarizing the input light transmitted from the polarizer and the prism into linearly-polarized light having a polarization direction independently selected according to each pixel, and reflecting the linearly-polarized light toward the prism; and an analyzer, disposed along the optical path of light between the ferroelectric liquid crystal display device and the dichroic beam splitter, for transmitting the light of one polarization direction of the input light reflected from the ferroelectric liquid crystal display device and the prism.

6. The reflection type projector of claim 1, wherein the first image forming unit is a digital mirror device including a plurality of reflection mirrors of a two-dimensional array structure, each of the plurality of mirrors being independently driven.

7. The reflection type projector of claim 1, wherein the second optical path changing unit comprises:
   a converging lens for converging input light; and
   a prism having a transmission/reflection surface for transmitting the input light from the converging lens and total internal reflecting the light reflected from the second image forming unit.

8. The reflection type projector of claim 7, wherein the transmission/reflection surface is disposed at an angle with respect to the optical axis of the light reflected from the second image forming unit which is greater than a critical angle.

9. The reflection type projector of claim 1, wherein the second image forming unit comprises:
   a polarizer for linearly-polarizing input light;
   a ferroelectric liquid crystal display device for linearly-polarizing light transmitted from the polarizer and passed through the second optical path changing unit, into light having a polarization direction selected independently according to each region and for reflecting the linearly-polarized light; and
   an analyzer, disposed along the optical path of the light between the ferroelectric liquid crystal display device and the dichroic beam splitter, for transmitting light of one polarization direction.

10. The reflection type projector of claim 7, wherein the second image forming unit comprises:
    a polarizer, disposed along the optical path of the light between the converging lens and the prism;
    a ferroelectric liquid crystal display device having a plurality of pixels for linearly-polarizing input light transmitted from the polarizer and the prism into light having a polarization direction independently selected according to each pixel, and reflecting the linearly-polarized light; and
    an analyzer, disposed along the optical path of light between the ferroelectric liquid crystal display device and the dichroic beam splitter, for transmitting light of one polarization direction of the input light reflected from the ferroelectric liquid crystal display device and the prism.

11. The reflection type projector of claim 1, wherein the second image forming unit is a digital mirror device having a plurality of reflection mirrors in a two-dimensional array structure, each of the plurality of mirrors being independently driven.

12. The reflection type projector of claim 1, wherein the third optical path changing unit comprises:
    a converging lens for converging input light; and
    a prism having a transmission/reflection surface for transmitting the light input from the converging lens and total internal reflecting the light reflected from the third image forming unit.

13. The reflection type projector of claim 12, wherein the transmission/reflection surface has an angle with respect to input light reflected from the third image forming unit which is greater than a critical angle.

14. The reflection type projector of claim 1, wherein the third image forming unit comprising:
    a polarizer for linearly-polarizing input light;
    a ferroelectric liquid crystal display device for linearly polarizing input light transmitted from the polarizer and passed through the third optical path changing unit, into linearly-polarized light having a polarization direction independently selected according to respective regions; and
    an analyzer, disposed along the optical path of the light between the ferroelectric liquid crystal display device and the dichroic beam splitter, for transmitting light of one polarization direction.

15. The reflection type projector of claim 12, wherein the third image generation unit comprises:
    a polarizer, disposed along the optical path of the light between the converging lens and the prism, for linearly polarizing input light;
    a ferroelectric liquid crystal display device having a plurality of pixels for linearly polarizing the input light transmitted from the polarizer and the prism into linearly polarized light having a polarization direction independently selected according to each pixel, and reflecting the linearly-polarized light toward the prism; and
    an analyzer, disposed along the optical path of light between the ferroelectric liquid crystal display device and the dichroic beam splitter, for transmitting light of one polarization direction of the input light reflected from the ferroelectric liquid crystal display device and the prism.

16. The reflection type projector of claim 1, wherein the third image forming unit is a digital mirror device including a plurality of reflection mirrors of a two-dimensional structure, each of the plurality of mirrors being independently driven.

17. The reflection type projector of claim 1, comprising:
    a light mixing unit disposed along the optical path of the input light between the light source and the first dichroic mirror, for making the input light from the light source into uniform light by at least one of diverging, converging, diffusing and reflecting the input light from the light source.

18. The reflection type projector of claim 17, wherein the light mixing unit comprises:
    a first and a second fly-eye lens disposed adjacent to each other, each having a plurality of convex portions at on of an input surface and an output surface thereof, each of the convex portions converging input light; and
    a converging lens for converging the light transmitted from the second fly-eye lens to form parallel light beams.

19. The reflection type projector of claim 17, wherein the light mixing unit is a scrambler fabricated from glass and having a hexahedron shape with an input surface and an output surface that are perpendicular to the optical path of the light to make the input light uniform by diffusing and reflecting the input light.

20. The reflection type projector of claim 1, comprising a correction prism formed on an outer surface of the dichroic beam splitter, for correcting an aberration of input light.

21. The reflection type projector of claim 1, wherein each one of the first, second, and third image forming units receives light having wavelengths that are not received by the other two image forming units.

* * * * *